(12) United States Patent
Gates et al.

(10) Patent No.: US 7,743,757 B2
(45) Date of Patent: Jun. 29, 2010

(54) SYSTEM AND METHOD FOR EXHAUST GAS RECIRCULATION

(75) Inventors: Freeman Carter Gates, Bloomfield Hills, MI (US); Sassan Farahmand, Canton, MI (US); Songping Yu, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/780,066

(22) Filed: Jul. 19, 2007

(65) Prior Publication Data

US 2009/0019851 A1  Jan. 22, 2009

(51) Int. Cl.
*F02B 47/08* (2006.01)

(52) U.S. Cl. .............. 123/568.2; 123/568.11; 123/568.12; 60/601; 60/602; 60/606

(58) Field of Classification Search ........... 60/605.2, 60/600, 601–603, 606, 607, 598; 701/101–105, 701/108; 123/486, 488, 568.2, 568.12, 58.17, 123/568.16, 323, 568.11, 568.18; F02B 47/08

See application file for complete search history.

(56) References Cited

U.S. PATENT DOCUMENTS

| | | | | |
|---|---|---|---|---|
| 4,212,066 A | * | 7/1980 | Carp et al. | 701/103 |
| 4,249,382 A | * | 2/1981 | Evans et al. | 60/605.2 |
| 4,725,040 A | | 2/1988 | Fornuto et al. | |
| 4,805,569 A | * | 2/1989 | Suzumura et al. | 123/308 |
| 6,390,078 B1 | | 5/2002 | Gee et al. | |
| 6,422,217 B1 | * | 7/2002 | Feucht et al. | 123/568.11 |
| 6,459,985 B1 | | 10/2002 | Kotwicki et al. | |
| 6,480,782 B2 | * | 11/2002 | Brackney et al. | 701/108 |
| 6,609,058 B1 | | 8/2003 | Russell et al. | |
| 6,945,236 B2 | * | 9/2005 | Nakai et al. | 123/568.12 |
| 7,461,629 B2 | * | 12/2008 | Ball et al. | 123/323 |

FOREIGN PATENT DOCUMENTS

EP  0137282  4/1985

* cited by examiner

*Primary Examiner*—Stephen K Cronin
*Assistant Examiner*—Keith Coleman
(74) *Attorney, Agent, or Firm*—Allan J. Lippa; Alleman Hall McCoy Russell & Tuttle LLP

(57) ABSTRACT

A system and method for controlling EGR of an internal combustion engine is presented. The system is capable of controlling EGR over a wide range of flow rates.

14 Claims, 3 Drawing Sheets

SYSTEM AND METHOD FOR EXHAUST GAS RECIRCULATION

FIELD

The present description relates to a system and method for exhaust gas recirculation (EGR) that exhibits control over a large range of flow rates.

BACKGROUND

Exhaust gas recirculation (EGR) between an exhaust manifold and intake manifold may be regulated in many ways. One device for controlling EGR is presented in European Patent Application 0137282. This method describes controlling a series of valves in an attempt to achieve a desired EGR flow rate. In particular, valves are set to an open position in combinations that approach the desired EGR flow rate. In one example, the valves are selected from a binary pattern that represents a predetermined EGR flow rate. The selected binary pattern changes with engine speed and temperature.

The above-mentioned method can also have several disadvantages. Namely, the valves operate in a completely open-loop manner. That is, the engine controller selects a number and pattern of valves that are suppose to deliver the desired EGR flow rate. However, over time carbon deposits may alter the flow characteristics of the valves such that a different amount of EGR flows than is desired. In addition, since the valves are controlled in a binary fashion, the EGR flow rate will be interrupted and discontinuous when the number of open valves changes.

The inventors herein have recognized the above-mentioned disadvantages and have developed a system and method to deliver EGR to an internal combustion engine that offers substantial improvements.

SUMMARY

One example approach to overcome at least some of the disadvantages of prior approach includes a system for controlling exhaust gas recirculation of an internal combustion engine, system comprising: a first valve positioned to control flow through a first conduit; a second valve positioned to control flow through a second conduit; and a controller to position said first valve in response to a pressure in said first conduit and a pressure in said second conduit when said second valve is closed, and to position said second valve in response to a pressure in said second conduit and a pressure in said first conduit when said first valve is closed. This method can be used to reduce the above-mentioned limitations of the prior art approach.

A two orifice EGR valve can be controlled to deliver a wide dynamic range of EGR flow rates. In one example, a single differential pressure transducer can be used to determine EGR flow through two separate orifices. The EGR flow rate can be used by a controller to position valves that control the flow rate through the respective orifices. This arrangement allows EGR flow to be continuously controlled over a wide flow rate range. In addition, since the orifices can be sharp edged orifices they tend to be less affected by carbon in exhaust gases. Consequently, the orifice and controller allow more precise control of EGR over a long period of time and a variety of engine operating conditions.

The present description provides several advantages. Specifically, the method can provide continuous and uninterrupted EGR flow over a wide range of engine operating conditions. The system and method also provide unexpected results. Specifically, system cost can be reduced and system reliability can be increased when the present system and method is compared to other high flow rate EGR systems. By ingeniously configuring the system to utilize a single sensor to provide EGR flow feedback, system cost is reduced because a sensor is not necessary for each orifice. Furthermore, reliability is increased because a single sensor is used to determine EGR flow rates through two different orifices. By reducing the number of sensors, there is a lower possibility of sensor degradation in the system, and this increases system reliability.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
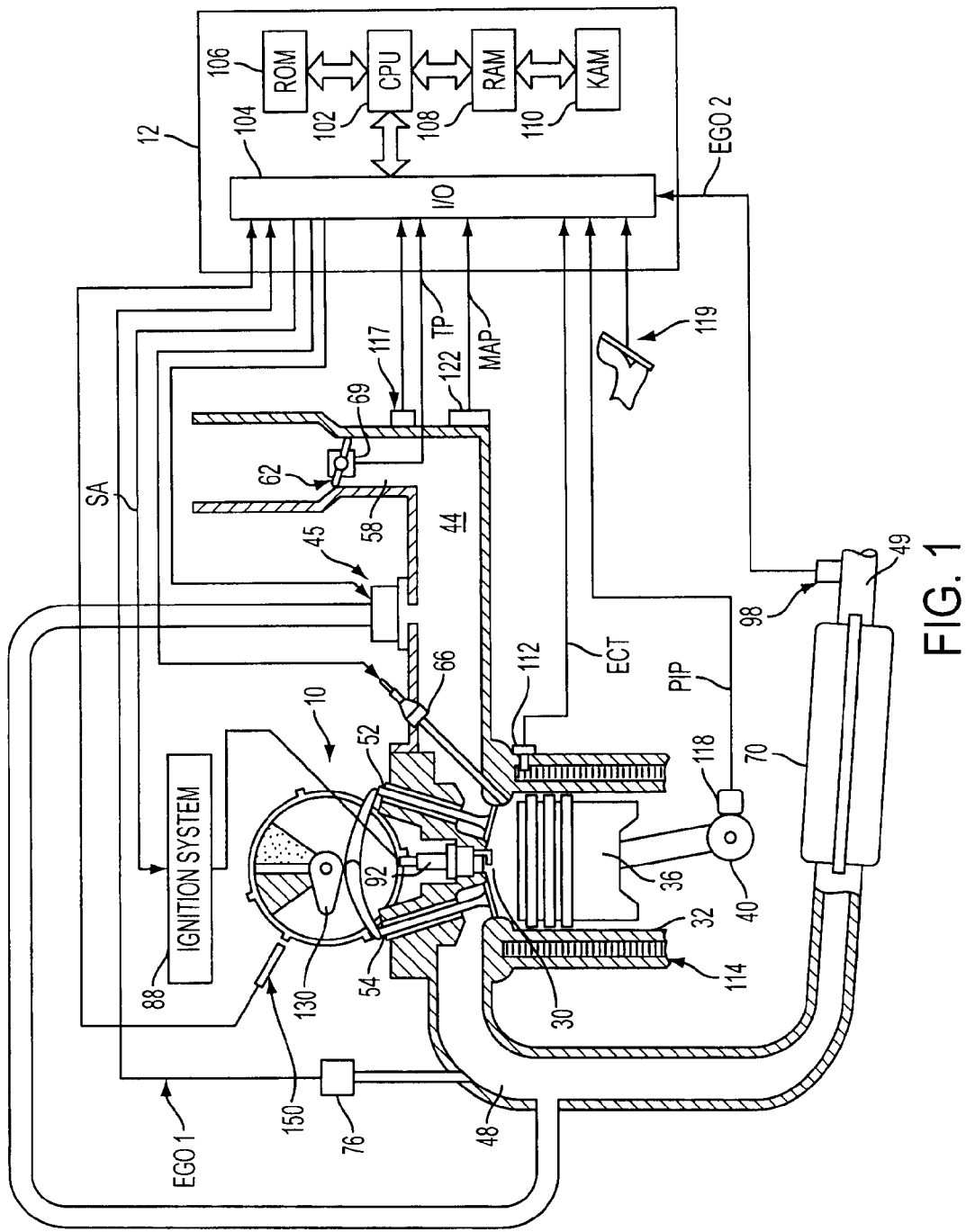
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with cam shaft 130 and piston 36 positioned therein and connected to crankshaft 40. Combustion chamber 30 is known communicating with intake manifold 44 and exhaust manifold 48 via respective intake valve 52 an exhaust valve 54. Exhaust manifold 48 is shown in communication with intake manifold 44 via EGR tube 46 and EGR valve 45. Alternatively, EGR may flow from the exhaust manifold or exhaust ports to the intake ports. Fuel injector 66 is shown having a nozzle capable if injecting fuel directly into combustion chamber 30 in an amount in proportion to the pulse width of a signal from controller 12. Fuel is delivered to fuel injector 66 by fuel system (not shown) including a fuel tank, fuel pump, and fuel rail (not shown). Intake manifold 44 is also shown communicating with throttle body 58 via throttle plate 62.

Conventional distributorless ignition system 88 provides ignition spark to combustion chamber 30 via spark plug 92 in response to controller 12. Alternatively, the spark plug and ignition system may be removed for compression ignition engines. Two-state exhaust gas oxygen sensor 76 is shown coupled to exhaust manifold 48 upstream of catalytic converter 70. Alternatively, a Universal Exhaust Gas Oxygen (UEGO) sensor may be substituted for two-state sensor 76. Two-state exhaust gas oxygen sensor 98 is shown coupled to exhaust pipe 49 downstream of catalytic converter 70. Sensor 76 provides signal EGO1 to controller 12.

Controller 12 is shown in FIG. 1 as a conventional microcomputer including: microprocessor unit 102, input/output ports 104, and read-only memory 106, random-access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; throttle position from throttle position sensor 69; a measurement of manifold absolute pressure (MAP) form pressure sensor 122 coupled to intake manifold 44; a measurement (ACT) of engine air amount temperature or manifold temperature from temperature sensor 117; a cam position signal (CAM) from a variable reluctance cam sensor 150; and a crankshaft position signal (CPS) from a variable reluctance sensor 118 coupled to a crankshaft 40, and an engine torque demand sensor 119. Alternatively, other types of sensors may be substituted for the above-mentioned sensor type (e.g., Hall sensors or optical sensors may be used in place of variable reluctance sensors).

Figure 2:
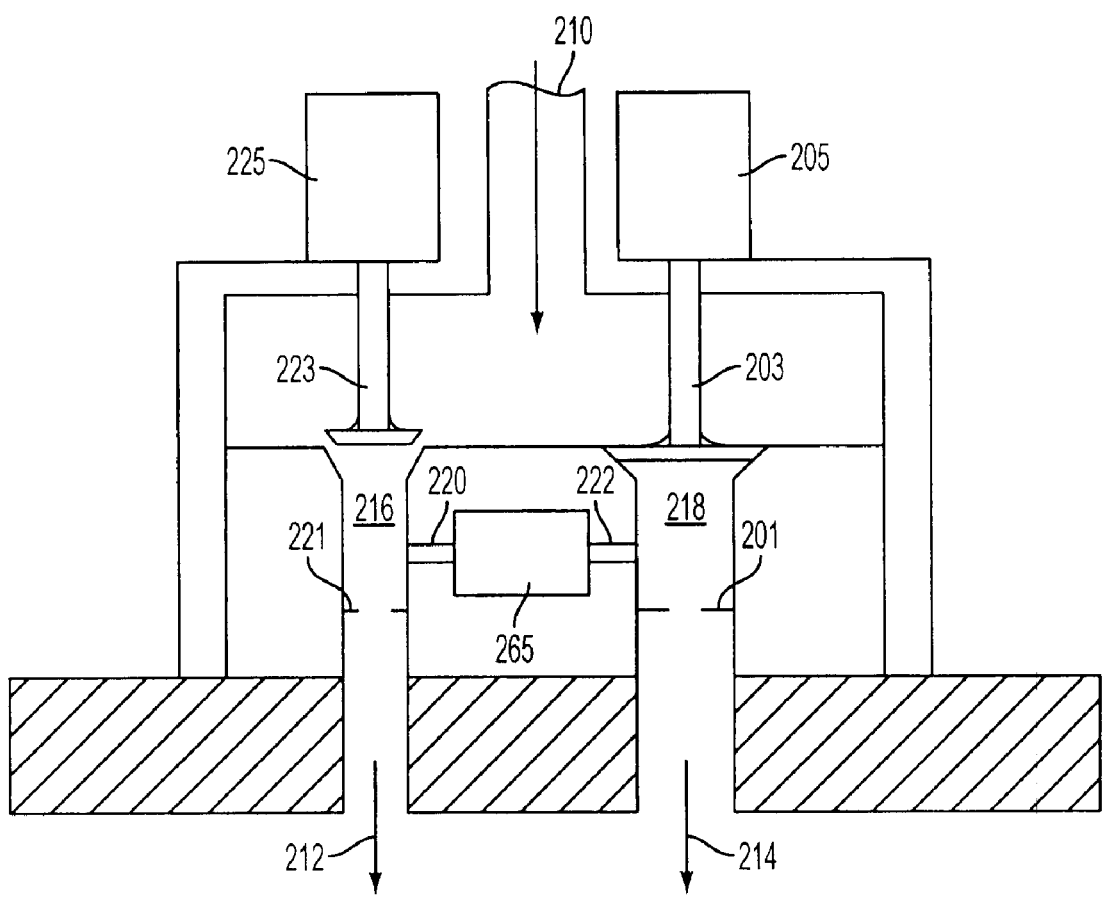
FIG. 2 is a schematic diagram of an EGR control apparatus.

Referring now to FIG. 2, a schematic of an example EGR control apparatus is shown. In this example valve, EGR enters the control apparatus at port 210 from the engine exhaust manifold and flows in the direction indicated by the arrow. The positions of valves 203 and 223 determine which orifice 221 or 201 exhaust gases pass through on the way to the engine intake manifold. In alternative embodiments, orifices 221 and 201 may be nozzles or venturi style orifices. Linear solenoids 225 and 205 are supplied a duty cycled voltage such that they control the position of valves 223 and 203 respectively. Alternatively, linear solenoids 205 and 225 can be replaced by linear motors or by motors having ball screws or similar translation devices. Exit ports 212 and 214 provide separate conduits from orifices 221 and 201 to the engine intake manifold. Valves 223 and 203, orifices 221 and 201, and conduits 216 and 218 are sized differently to provide precise control at different flow rates. Differential pressure sensor 265 senses pressure in conduits 216 and 218 via sample ports 220 and 222. Each of these ports is positioned between an orifice and a control valve. The differential pressure sensor output may be unsigned (i.e., absolute value), if desired.

The figure shows valve 203 in the closed position. While valve 203 is in the closed position pressure in conduit 218 equilibrates to the pressure in the engine intake manifold because port 214 provides a path to the intake manifold. This exposes differential pressure transducer 265 to a pressure differential that exists when there is flow through orifice 221. Given the orifice diameter and the pressure across an orifice, Bernoulli's law can be applied to determine the EGR flow rate. The determined EGR flow rate allows a controller (e.g., controller 12, FIG. 1) to provide closed-loop control of valve 223. That is, a controller can monitor the flow through orifice 221 by monitoring the pressure differential across and orifice and command solenoid 225, thereby adjusting the position of valve 223 in response to the actual flow through an orifice. If the desired EGR flow rate exceeds the flow capacity of orifice 221, valve 223 can be closed and valve 203 opened so that the EGR flow capacity is increased. When valve 223 is closed, pressure in differential pressure sensor port 220 equilibrates to intake manifold pressure and differential pressure sensor 265 is exposed to the pressure difference across orifice 201. Similar to flow through orifice 221, flow through orifice 201 can be determined when the orifice diameter and pressure differential across the orifice have been determined.

Note that the dimensions and layout of the EGR apparatus illustrated in FIG. 2 can be modified without departing from the scope or intent of the present description. Accordingly, other embodiments utilizing a single differential pressure sensor to determine EGR flow through separate orifices is anticipated by the present inventors.

Figure 3:
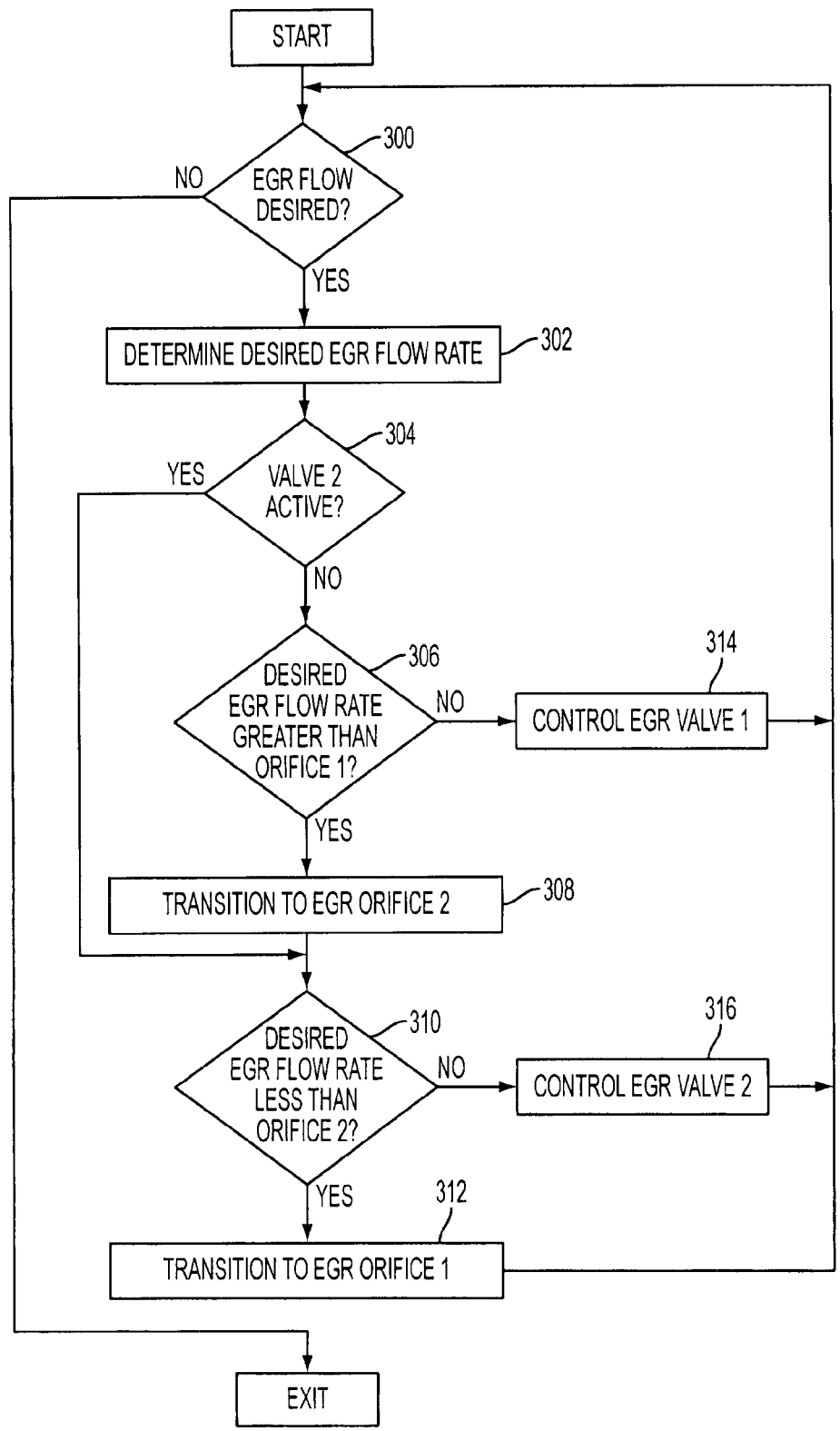
FIG. 3 is a flow chart of an example engine EGR strategy.

Referring now to FIG. 3, a flow chart of an example strategy executable by a controller to start an engine is shown. In step 300, the routine determines if EGR is desired. If so, the routine proceeds to step 302. If not, the routine proceeds to exit.

In step 302, the routine determines a desired EGR flow rate based on engine operating conditions. The desired flow rate of EGR to the engine is predetermined and stored in a table or function in the memory of engine controller 12, FIG. 1, for example. The table is indexed by engine speed and load (i.e., the engine air charge amount relative to the theoretical engine air charge capacity at standard temperature and pressure). After retrieving the desire EGR flow rate the routine proceeds to step 304.

In step 304, the routine determines if valve number two is active. In this embodiment, orifice number two has a higher flow capacity than orifice number one. However, at lower flow rates, flow variation increases for the higher capacity orifice and valve. Therefore, the lower capacity orifice, orifice number one, is used with valve number one while the desired EGR is in a low range. If orifice number two and valve number two are active, the routine proceeds to step 310. Otherwise, the routine proceeds to step 306.

In step 306, the routine determines if the desired EGR flow rate is greater than the capacity of orifice number one. That is, the routine determines if the desired flow rate is approaching the orifice sonic flow rate. If yes, the routine proceeds to step 308. If not, the routine proceeds to step 314.

In step 314, the routine controls EGR valve number one to deliver the desired EGR flow rate.

In one example, engine controller 12, FIG. 1, determines the pressure ratio across orifice number one by making an inquiry of differential pressure sensor 265. Differential pressure sensor 265 may output an analog voltage or a digital series of bits (e.g., a word) that represent the differential pressure across orifice number one. Further, differential pressure may be sensed by a single device or by comparing the difference between the outputs of two separate devices. Since valve number two assumes a closed position in this step, one input to the differential pressure sensor is exposed to intake manifold pressure while the other input is exposed to the pressure between orifice number one and valve number one, see FIG. 2 for example. Bernoulli's law is applied based on the pressure observed across orifice number one. The actual flow rate through orifice number one is then compared to the desired flow rate to determine if the position of valve number one should be changed so that the actual flow rate through orifice number one matches the desired flow rate determined in step 302. Specifically, the actual flow rate is subtracted from the desired flow rate to create a flow rate error. The flow rate error can be input to a proportional/integral controller (PI) or other controller variant to adjust the open-loop valve command. Note that the desired flow rate determined in step 302 corresponds to a duty cycle output that is used to drive a linear solenoid. In one example, the duty cycle is a function of desire EGR flow and the pressure ratio between the exhaust manifold and the intake manifold. This duty cycle is used to command the position valve number one. The adjusted open-loop duty cycle (now closed-loop duty cycle) is output to solenoid number one and the routine proceeds to step 300. Thus, the valve controller can position a first valve located in a first conduit in response to a pressure in a first conduit and a pressure in a second conduit when a second valve located in a second conduit is in a closed position.

In step 308, the routine transitions from operating valve number one to operating valve number two. During the transition, valve number one and valve number two are simultaneously open for a brief period. Therefore, the differential pressure observed by sensor 265, FIG. 2, does not represent the pressure differential across either orifice number one or orifice number two. As such, the valve number one and valve number two are controlled in an open-loop manner. Specifically, valve number one is ramped from an open position to a closed position while valve number two is ramped to an open position. Each valve is ramped at predetermined rates so that flow variation is mitigated. The commanded duty cycle to the control solenoids is determined from the desired EGR flow and the difference between exhaust pressure and intake manifold pressure. Exhaust pressure may be measured or estimated. Intake manifold pressure may be directly measured or may be estimated based on mass air flow observations. The routine proceeds to step 310.

In step 310, the routine determines if the desired EGR flow rate is less than what is desired for flow through orifice number two. If so, the routine proceeds to step 312. Otherwise, the routine proceeds to step 316.

In step 316, EGR valve number two is controlled. Similar to the control mentioned in step 314, engine controller 12, FIG. 1, determines the pressure ratio across orifice number two by making an inquiry of differential pressure sensor 265. Alternatively, differential pressure may be sensed by a single device or by comparing the difference between the outputs of two separate devices. Since valve number one assumes a closed position in this step, one input to the differential pressure sensor is exposed to intake manifold pressure while the other input is exposed to the pressure between orifice number two and valve number two, see the description of FIG. 2 for example. Bernoulli's law is applied based on the pressure observed across orifice number two. The actual flow rate is then compared to the desired flow rate to determine if the position of valve number two should be changed so that the actual orifice number two flow rate matches the desired flow rate determined in step 302. Specifically, the actual flow rate is subtracted from the desired flow rate to create a flow rate error. Similar to step 314, the flow rate error is used to adjust the open-loop valve number two command. The adjusted open-loop duty cycle is output to solenoid number two and the routine proceeds to step 300. Thus, the valve controller can position a second valve located in a second conduit in response to a pressure in a first conduit and a pressure in a second conduit when a first valve located in a first conduit is in a closed position.

In step 312, the routine transitions from operating valve number two to operating valve number one. Similar to the transition in step 308, valve number two and valve number one are simultaneously open for a brief period. Therefore, the differential pressure observed by sensor 265, FIG. 2, does not represent the pressure differential across either orifice number one or orifice number two. As such, the valve number one and valve number two are again controlled in an open-loop manner. In this condition, valve number two is ramped from an open position to a closed position while valve number one is ramped to an open position. Again, each valve is ramped at predetermined rates so that flow variation is mitigated, and the commanded duty cycle to the control solenoids is determined from the desired EGR flow and the difference between exhaust pressure and intake manifold pressure. The routine proceeds to step 300.

As will be appreciated by one of ordinary skill in the art, the routine described in FIG. 3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but it is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for controlling an exhaust gas recirculation system of an internal combustion engine, the system including a first valve positioned to control flow through a first conduit and a second valve positioned to control flow through a second conduit, the first and second conduits both coupled to an intake manifold of the engine, the method comprising:

positioning said first valve in response to a pressure in said first conduit and a pressure in said second conduit when said second valve is closed, said first valve controlling a first exhaust gas recirculation flow through the first conduit and into the intake manifold; and positioning said second valve in response to a pressure in said second conduit and a pressure in said first conduit when said first valve is closed, said second valve controlling a second exhaust gas recirculation flow through the second conduit and into the intake manifold, said second flow higher than said first flow, wherein said first conduit includes a first orifice extending into the first conduit and wherein said second conduit includes a second orifice extending into the second conduit.

2. The method of claim 1 further comprising further positioning said first valve and said second valve in response to engine operating conditions.

3. A method for controlling an exhaust gas recirculation system of an internal combustion engine, the system including a first valve positioned to control flow through a first conduit and a second valve positioned to control flow through a second conduit, the first and second conduits both coupled to an intake manifold of the engine, the method comprising:

positioning said first valve in response to a pressure in said first conduit and a pressure in said second conduit when said second valve is closed, said first valve controlling a first exhaust gas recirculation flow through the first conduit and into the intake manifold; and positioning said second valve in response to a pressure in said second conduit and a pressure in said first conduit when said first valve is closed, said second valve controlling a second exhaust gas recirculation flow through the second conduit and into the intake manifold, said second flow higher than said first flow, wherein said pressure in said first conduit and said pressure in said second conduit are determined by a single sensor.

4. A system for controlling exhaust gas recirculation of an internal combustion engine, the system comprising:

an intake manifold for directing air to at least a cylinder of the internal combustion engine;

an exhaust manifold for directing exhaust gases from said at least a cylinder of said internal combustion engine; and an exhaust gas recirculation apparatus, said exhaust gas recirculation apparatus having at least a first orifice, located in and extending into a first conduit wherein the first conduit is located upstream of the intake manifold and coupled to the intake manifold, and at least a second orifice, located in and extending into a second conduit wherein the second conduit is located upstream of the intake manifold and coupled to the intake manifold, said second orifice having higher flow capacity than said first orifice, said exhaust gas recirculation apparatus having at least a first valve located in said first conduit and at least a second valve located in said second conduit, and said exhaust gas recirculation apparatus having at least a differential pressure sensing device having a first pressure sensing input positioned in said first conduit and a second pressure sensing input positioned in said second conduit.

5. The system of claim 4 wherein said first pressure sensing input is positioned between said at least a first orifice and said at least a first valve.

6. The system of claim 5 wherein said second pressure sensing input is positioned between said at least a second orifice and said at least a second valve.

7. The system of claim 4 further comprising a controller for sampling an output of said at least a differential pressure sensing device and at least an engine operating condition, said controller varying a position of said at least a first valve and a position of said at least a second valve as said engine operating condition varies and as the output of said differential pressure sensing device varies.

8. The system of claim 7 wherein said controller adjusts the position of one of said first valve and said second valve in response to said output, while the other of said first valve and second valve is in a closed position.

9. The system of claim 4 wherein said at least a first valve and said at least a first orifice are used to control exhaust gas recirculation in a first flow range, and wherein said at least a second valve and said at least a second orifice are used to control exhaust gas recirculation in a second flow range, said second flow range greater than said first flow range.

10. The system of claim 4 wherein said differential pressure sensing device comprises an integrated circuit for determining a pressure difference between two input ports.

11. The system of claim 4 wherein said first orifice is positioned downstream of said first valve, in a direction of exhaust gas flow from said exhaust manifold to said intake manifold, and where said second orifice is positioned downstream of said second valve, in the direction of exhaust gas flow.

12. A method for controlling exhaust gas recirculation in a path that is external to a cylinder of an internal combustion engine, the path including an exhaust gas recirculation system having first and second parallel conduits each coupled to an intake manifold of the engine, the first conduit including a first valve and a first orifice downstream of the first valve, the second conduit including a second valve and a second orifice downstream of the second valve, the method comprising:
adjusting a position of the first valve during a first engine operating condition as a differential pressure varies, the differential pressure between a first pressure and a second pressure, the first pressure being between the first valve and the first orifice and the second pressure being between the second valve and the second orifice, while said second valve located in said second conduit is closed; and
adjusting a position of said second valve during a second engine operating condition as the differential pressure varies, while said first valve is closed, wherein said differential pressure is determined by a device in a single package.

13. The method of claim 12 wherein during said first operating condition said differential pressure is a pressure across the first orifice and wherein during said second operating condition said differential pressure is a pressure across the second orifice.

14. The method of claim 13 wherein said first orifice and said second orifice are different sizes, said second orifice having a higher flow capacity than said first orifice.

* * * * *